Dec. 2, 1924.  
F. HEATH  
1,517,728  
PRESSURE CONTROLLED VALVE  
Filed Jan. 26, 1923 2 Sheets-Sheet 1
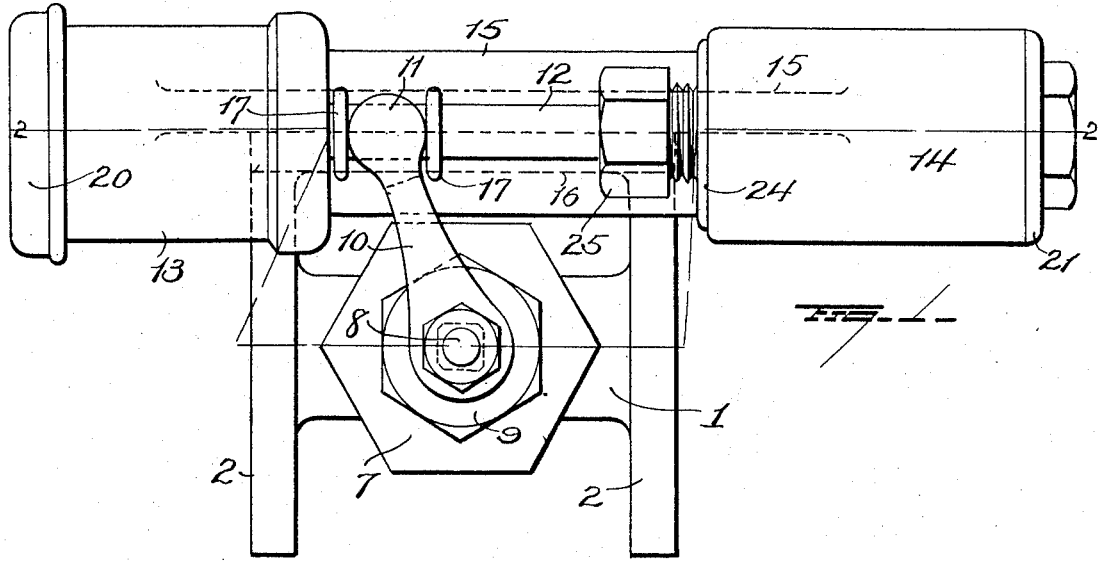
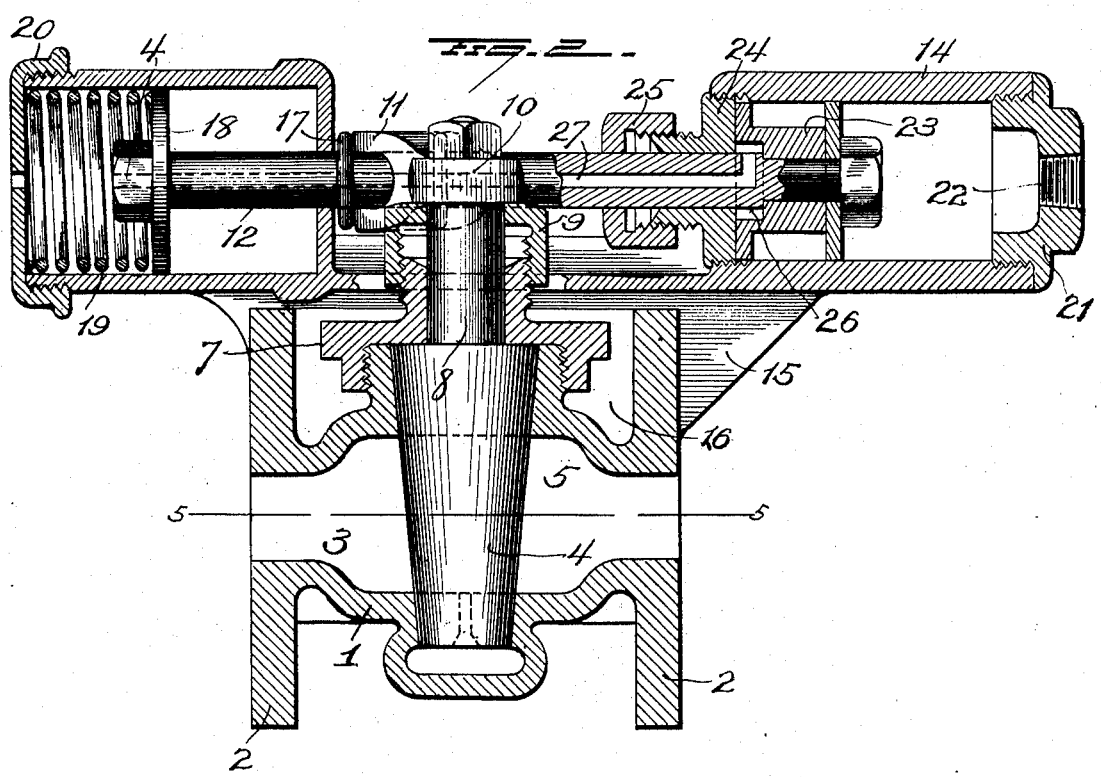
Inventor  
F. Heath  
By Seymour & Bright  
Attorneys Dec. 2, 1924. 1,517,728
F. HEATH
PRESSURE CONTROLLED VALVE
Filed Jan. 26, 1923 2 Sheets-Sheet 2
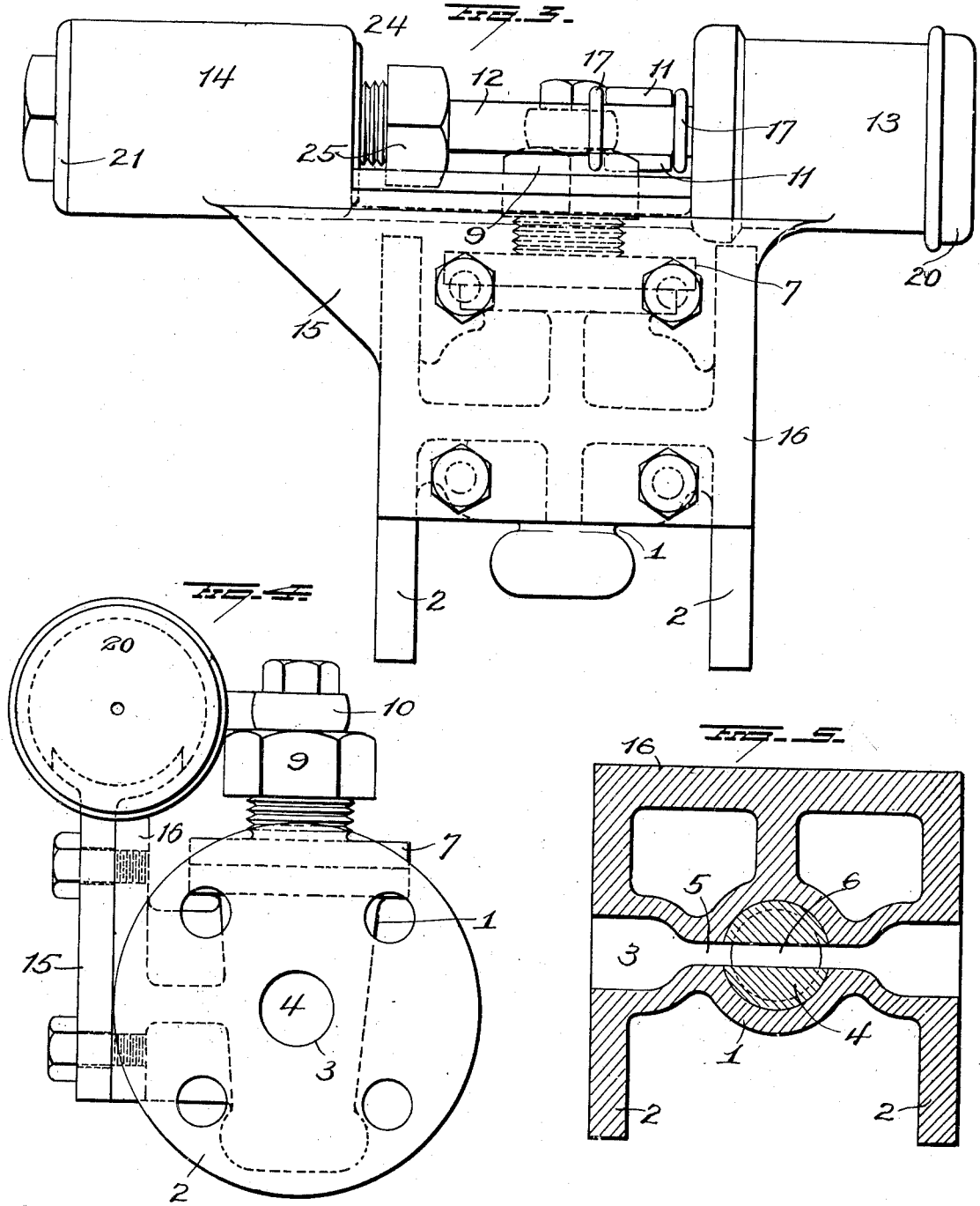

Patented Dec. 2, 1924.

1,517,728

UNITED STATES PATENT OFFICE.

FREDERICK HEATH, OF BELLINGHAM, WASHINGTON.

PRESSURE-CONTROLLED VALVE.

Application filed January 26, 1923. Serial No. 615,124.

*To all whom it may concern:*

Be it known that I, FREDERICK HEATH, a citizen of the United States, and a resident of Bellingham, in the county of Whatcom and State of Washington, have invented certain new and useful Improvements in Pressure-Controlled Valves; and I do hereby declare the following to be a full, clear, and exact description of the invention, such as will enable others skilled in the art to which it appertains to make and use the same.

This invention relates to pressure-controlled valves and has special reference to a turning plug valve which is normally open to permit motive fluid to flow to a pump and which is connected to the discharge line leading from the pump whereby upon reduction of pressure in the discharge line the valve will be closed and the flow of motive fluid cut off. The device is designed more particularly for use in steam boiler plants using oil for fuel and in which the oil is pumped under pressure to the burners, but it may be advantageously used in other fields.

The invention is illustrated in the accompanying drawings in which—

Figure 1 is a plan view of the improved valve;

Figure 2 is a section on the line 2—2 of Figure 1;

Figure 3 is a side elevation;

Figure 4 is an end elevation;

Figure 5 is a section on the line 5—5 of Figure 2.

The valve casing 1 is provided with flanges 2 whereby it may be coupled into the line conveying steam or other motive fluid to the pump or other engine. A passage 3 provides for the flow of steam through the casing and a turning plug 4 mounted in the casing extends across the passage to control the flow therethrough. The passage 3, within the casing, expands in one direction and contracts in a direction at a right angle to the direction of expansion, as indicated at 5, to assume the form and dimensions of the slot or port 6 through the plug, as will be readily understood upon reference to Figure 5. When the plug is in the position shown in Figure 5, flow to the pump is permitted but if the plug be turned so that the slot 6 is not alined with the passage 3 and a solid portion of the plug extends across the passage, the flow will be cut off. The plug is tapered, as shown in Figure 2, so that it may be easily placed in position, and a cap 7 is secured on the casing over the larger end of the plug around the stem 8 rising therefrom, a gland 9 being mounted on the cap as shown. Above the gland, a crank arm 10 is secured to the stem, the outer or free end of said arm being forked, as at 11, to span a piston rod 12 which extends between and through the inner ends of alined cylinders 13 and 14. The said cylinders are carried by a plate or bracket 15 which is secured to a web 16 on the side of the valve casing so that the cylinders are disposed at opposite sides of the axis of the plug. The cylinders are preferably integral with the plate or bracket 15 and the cylinder 13 has an open outer end but its inner end is imperforate except for a central opening to admit the piston rod 12. The piston rod is provided with annular abutments 17 between which the free forked end of the arm 10 engages so that movement of the rod will be transmitted to the arm, and, within the cylinder 13, a piston disk 18 is secured to the rod, a coiled spring 19 being arranged within the cylinder between said piston and the cap 20 secured upon the outer end of the cylinder. The spring bears constantly upon the piston and tends to move the same toward the inner end of the cylinder.

The outer end of the cylinder 14 is closed by a head 21 having a central port 22 therein in which is secured the end of a by-pass (not shown) leading from the delivery line extending from the pump. Within this cylinder, a piston 23 is secured upon the piston rod to be acted upon by the oil or other liquid under pressure entering through the port 22. The inner end of the cylinder 14 is closed by a head 24 carrying a gland 25. The inner side or end of the piston 23 is recessed, as shown at 26, and the piston rod 12 has a passage 27 extending longitudinally thereof, one end of said passage opening into the recess 26 and the other end of the passage opening into the cylinder 13 between the outer end thereof and the piston 18. The cap 20 is, of course, provided with an opening to permit escape of the air flowing from the cylinder 14 through the passage 27. This arrangement avoids the trapping of air in the cylinder 14 to interfere with prompt closing movement of the valve when the necessity for such action arises.

Normally, the parts are the positions illustrated in Figures 2 and 5, motive fluid passing through the valve casing and pressure from the discharge side of the pump being exerted through the port 22 upon the piston 23, said pressure overbalancing the force of the spring 19 and holding the valve in open position. Should the pressure in the delivery line from the pump be reduced from any cause, the reduction will be manifested in the cylinder 14 so that the spring 19 will expand and will force the piston 18 toward the inner end of the cylinder 13 and the piston 23 toward the outer end of the cylinder 14, the resulting movement of the piston rod 12 causing the arm 10 to swing and turn the plug 4 to closed position, cutting off the flow of steam through the valve.

It will be readily noted that I have provided a quick-acting, simple and compact device by the use of which the operation of the apparatus controlled by it will be automatically stopped when a leak or other cause of subnormal pressure develops in the delivery line.

Having fully described my invention what I claim as new and desire to secure by Letters-Patent, is:—

1. In means for controlling flow of a motive fluid, the combination of spaced alined cylinders, pistons in the cylinders, a piston rod fixed to and connecting the pistons and extending through the inner ends of the cylinders, spaced abutments on the piston rod between the cylinders, a passage for motive fluid at one side of the cylinders, a rotary cut-off valve in said passage, a radial arm fixed to said valve on the axis thereof and extending radially therefrom to the piston rod and engaging between the abutments thereon, means for admitting fluid under pressure through the outer end of one cylinder to act on the piston therein and hold said piston normally at the inner end of the cylinder with the cut-off valve open, and an expansible pressure element in the other cylinder at the outer end thereof acting constantly on the piston therein in opposition to the fluid under pressure whereby upon reduction of the fluid pressure the pistons will be moved toward the outer end of the first cylinder and the cut-off valve will be closed.

2. In means for controlling the flow of a motive fluid, the combination of spaced alined cylinders, pistons in the cylinders, a piston rod fixed to and connecting the pistons and extending through the inner ends of the cylinders, spaced abutments on the piston rod between the cylinders, a passage for motive fluid at one side of the cylinders, a rotary cut-off valve in said passage, a radial arm fixed to said valve on the axis thereof and extending to the piston rod and engaging between the abutments thereon, means for admitting fluid under pressure through the outer end of one cylinder to act on the piston therein and hold said piston normally at the inner end of the cylinder with the cut-off valve open, and an expansible pressure element in the other cylinder at the outer end thereof acting constantly on the piston therein in opposition to the fluid whereby upon reduction of the fluid pressure the pistons will be moved toward the outer end of the first cylinder and the cut-off valve will be closed, and a vent extending longitudinally through the piston rod and establishing communication between the inner end of the first cylinder and the outer end of the second cylinder.

In testimony whereof, I have signed this specification in the presence of two subscribing witnesses.

FREDERICK HEATH.

Witnesses:
HENRY BAILEY DRISKO,
BERTON WALDRON HUNTOON.